May 27, 1952  R. L. GORSKY ET AL  2,597,929
IMPRESSION DEVICE FOR MAKING DENTURES
Filed April 23, 1951
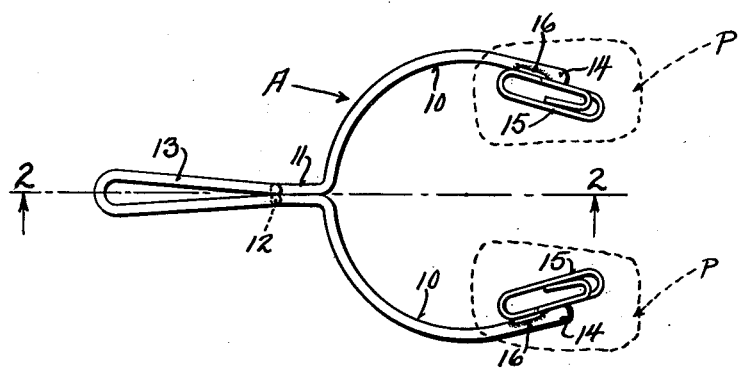
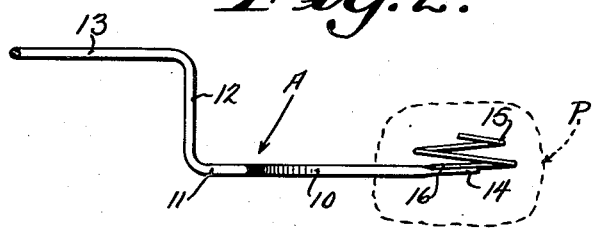
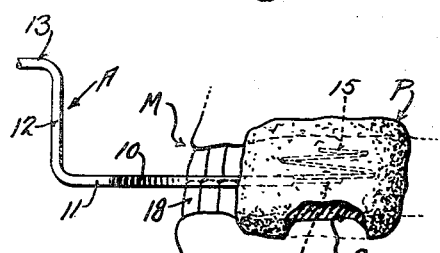
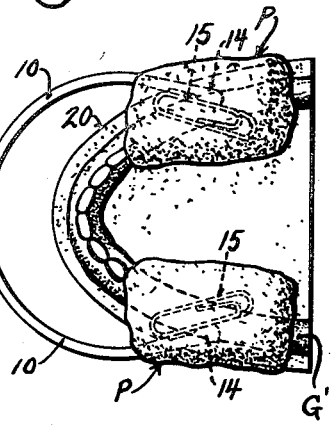
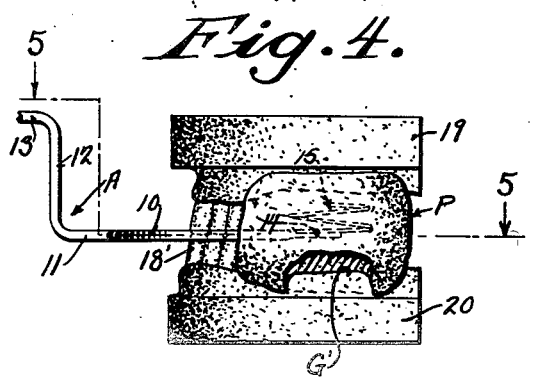
INVENTORS
REUBEN L. GORSKY
DOLPH R. ILLING
BY *Young Wright*
ATTORNEYS Patented May 27, 1952

2,597,929

UNITED STATES PATENT OFFICE 2,597,929

IMPRESSION DEVICE FOR MAKING DENTURES

Reuben L. Gorsky, Racine, and Dolph R. Illing, Milwaukee, Wis.

Application April 23, 1951, Serial No. 222,346

2 Claims. (Cl. 32—19)

This invention appertains to dental appliances, and more particularly to instruments employed in the making of artificial dentures or bridgework in dental operations.

In the making of dentures, it is customary to insert wax or plaster in the mouth for making an impression of the gums and remaining teeth, if any, after which a model is made from this mold by the dental laboratory, and great care is exercised in endeavoring to get the correct bite, mouth postures, etc. The present invention relates to a method and apparatus for obtaining a further mouth impression where there are remaining front teeth and after the making of the upper and lower casts from the first impression obtained from the plaster or wax mold.

Therefore, the primary object of our invention is to provide an improved dental appliance for obtaining accurate bite registrations, and by the use of which the operator is enabled to secure a substantially perfect working relationship between upper and lower dental casts when these are to be mounted on an articulator.

For accomplishing this purpose, we provide a novel instrument for registering teeth impressions as well as dental recesses and cavities, and in which the essential feature of novelty lies in the support of the impression material, whereby all interference from the tongue inside the arches or teeth structure is eliminated and a more accurate, as well as a more comfortable, operation is assured.

A more specific object of our invention is to provide sinuous retaining means for the impression material which is particularly adapted to holding gobs of plaster.

A still further object is to provide a bite-registering device which is simple in construction, reliable in its operation, and not liable to get out of order.

With these and other objects in view, and to the end of attaining any other advantage hereinafter appearing, this invention consists in certain features of construction and combinations and arrangement of parts hereinafter described, pointed out in the claims and illustrated in the accompanying drawings.

In the drawings:

Figure 1 is a top plan view showing our dental appliance constructed in accordance with the present invention, and illustrating in dotted lines the position of the gobs of plaster held thereon.

Figure 2 is a side elevational view, partly in section, taken on the line 2—2 of Figure 1, and looking in the direction of the arrows.

Figure 3 is a side elevational view illustrating the use of our appliance for taking the bite impression in the mouth of a patient.

Figure 4 is a view similar to Figure 3, but illustrating our appliance in position between the upper and lower casts for aligning accurately the bite impression taken in the mouth of the patient as shown in Figure 3.

Figure 5 is a top plan view of our appliance showing its position in relation to the lower cast, the view being taken substantially on the line 5—5 of Figure 4, and looking in the direction of the arrows.

Referring now to the drawings in detail, wherein similar reference characters designate corresponding parts throughout the several views, the letter A generally indicates one type of our improved holder, and referring in particular to Figures 1 and 2, it will be noted that the holder A is formed from a continuous length of heavy gauge stainless steel wire, and includes a pair of forwardly extending curved arms or bows 10. The curved arms or bows 10 converge toward their rear ends at 11 and are extended vertically and upward at 12 and thence extend rearwardly to form a manipulating handle loop 13.

The forward ends of the arms 10 are flattened as at 14. These flattened portions 14 have fastened thereto sinuous retainers 15 which are suitably secured by spot welding as illustrated by the numeral 16. The sinuous retainers 15 are formed from a resilient length of spring wire of a somewhat lighter gauge than the bow or holder A, and are particularly designed to hold soft gobs of impression plaster P.

While the retainers 15 may hold the standard type of impression wax, it is desirable in bite-registering devices to employ a plaster which will harden in a very short time when placed in the patient's mouth and exposed to the air. In this manner, the impression formed on the plaster will not be misshaped thereafter by accidental pressure as would be the case with the use of impression wax.

Referring now to Figures 3, 4 and 5, it will be readily apparent that the impression of the upper and lower gums G and remaining teeth 18 have been taken in the mouth M of the patient and the initial upper and lower casts 19 and 20 have been made, reproducing the formation and contours of the mouth as represented by teeth 18' and gums G'. It now becomes necessary, prior to the making of the artificial denture or bridgework, to properly align the upper and lower casts 19 and 20 and to mount them in an articulator, so that the bite and mouth posture will be accurately reproduced; and so that the denture or bridgework made therefrom will exactly conform to the normal and correct bite of the patient.

To obtain this bite, gobs of soft moldable plaster are placed on and around the sinuous retainers 15, and it is to be noted that not only does the shape of the retainer give support to the plaster in a horizontal plane, but also by extending sinuously upward therethrough forms a vertical support for the soft gob of plaster. This prevents both the longitudinal or horizontal movement of the plaster with respect to the holder, as well as any tendency that it may have to rotate or move vertically.

The holder or appliance A is then placed in the patient's mouth in rear of the remaining teeth, substantially as shown in Figure 3, and the patient goes ahead and closes his mouth according to his normal bite and the correct impression of the gum G is formed in the plaster as shown. After the plaster has hardened to the desired extent, the appliance is removed from the patient's mouth and then is placed between the upper and lower castings 19 and 20 to insure that the accurate forming of the gum line G' in the upper and lower castings 19 and 20 will correspond and be aligned correctly to the normal bite of the patient.

By referring now to Figures 1 and 5, it can be seen that the sinuous retainers 15 are fastened at the inner periphery of the bows or arms 10, and form a continuation thereof. Obviously, the retainers 15 could be secured by any means and at any position on the flat portions 14. However, it has been found in actual practice that the preferred form is as illustrated, and by referring particularly to Figure 5 the position of the retainers 15 to the gobs of plaster and lower cast 20 is readily apparent. In this manner, the resilient retainer 15 and flattened portions 14 of the bows 10 extend somewhat diagonally across the main body of the soft moldable plaster P, and due to the resiliency of the retainers they readily yield and expand to thoroughly embed themselves in the impression material.

The design of our appliance and holder A and the novel formation of the sinuous retainer 15 will allow our device to be adapted to any size of mouth or dental arch, as well as any anterior-posterior position, and can also be used either side up as best suits the conditions of use.

It will therefore be apparent that we have devised a very practical and highly efficient device for obtaining accurate bit registrations in connection with either partial denture and removable bridgework or full dentures, as the case may be.

From the foregoing, it is believed that the features and advantages of the invention will be readily apparent to those skilled in the art, and it will, of course, be understood that changes in the form, proportions and minor details of construction may be resorted to without departing from the spirit of the invention or the scope of the appended claims.

We claim:

1. A dental bite-registering appliance comprising a body portion formed from a continuous length of heavy gauge wire, said body including, a pair of curved bows which converge at their rear ends and terminate in a manipulating handle loop, and a pair of resilient sinuous retainers each secured at one end to the forward end of a respective bow and extending vertically upward therefrom.

2. A dental bite-registering appliance comprising a body portion formed from a continuous length of heavy gauge wire, said body including, a pair of curved bows which converge at their rear ends, said bows extending vertically upward from their rear ends and thence rearwardly terminating in a manipulating handle loop, said forward end of each bow being flattened, and a pair of sinuous retainers each secured at one end to the flattened portion of a respective bow, each sinuous retainer being secured adjacent the inner periphery of each bow and forming a forward continuation thereof.

REUBEN L. GORSKY.
DOLPH R. ILLING.

REFERENCES CITED

The following references are of record in the file of this patent:

UNITED STATES PATENTS

| Number | Name | Date |
|---|---|---|
| 2,313,535 | Glitzke | Mar. 9, 1943 |